United States Patent [19]

Waldrop et al.

[11] 3,730,441
[45] May 1, 1973

[54] FORAGE HARVESTER

[75] Inventors: Thomas W. Waldrop; Robert A. Wagstaff, both of New Holland; Joseph K. Weinlader, Akron, all of Pa.

[73] Assignee: Sperry Rand Corporation, New Holland, Pa.

[22] Filed: Apr. 29, 1971

[21] Appl. No.: 138,540

[52] U.S. Cl. ........................... 241/60, 241/223, 83/98
[51] Int. Cl. .............................................. B02c 18/06
[58] Field of Search ..................... 146/107 L, 107 T, 146/117 R, 117 A, 120; 83/98, 356.3, 355; 241/60, 223

[56] References Cited

UNITED STATES PATENTS

| | | |
|---|---|---|
| 3,401,729 | 9/1968 | Wallin et al. ........................ 146/107 L |
| 1,713,094 | 5/1929 | Saiberlich et al. .................. 146/107 T |
| 1,769,163 | 7/1930 | Raney et al. ........................ 146/107 L |
| 3,523,411 | 8/1970 | Waldrop et al. .................... 146/107 T |

*Primary Examiner*—Andrew R. Juhasz
*Assistant Examiner*—Z. R. Bolinsky
*Attorney*—John C. Thompson, Joseph A. Brown and James J. Kennedy

[57] ABSTRACT

A forage harvester extending transversely to the forward direction of travel has a feed roll mechanism and cutterhead at the outboard end and a forage blower at the inboard end. A transverse auger delivers silage from the cutterhead to the blower. The feed roll mechanism feeds harvested crops received from a forwardly mounted pickup or row crop attachment to the cutterhead. The cutterhead has a rotating reel with blades to chop the harvested crop into silage. The transversely positioned forage blower is in substantial alignment with a rear connection for a forage wagon and a forward tractor hitch to set the position of an adjustable discharge spout on the forage blower to impel silage generally longitudinally into a trailing forage wagon. The fan of the blower is mounted on a rearwardly extending gearbox shaft coupled to the main input drive shaft which extends forwardly along the tractor hitch to the tractor power take-off. The feed roll mechanism and cutterhead are driven from the gearbox by a generally transversely extending drive which includes a reversing drive for rotating the reel in reverse on sharpening of the blades.

11 Claims, 7 Drawing Figures

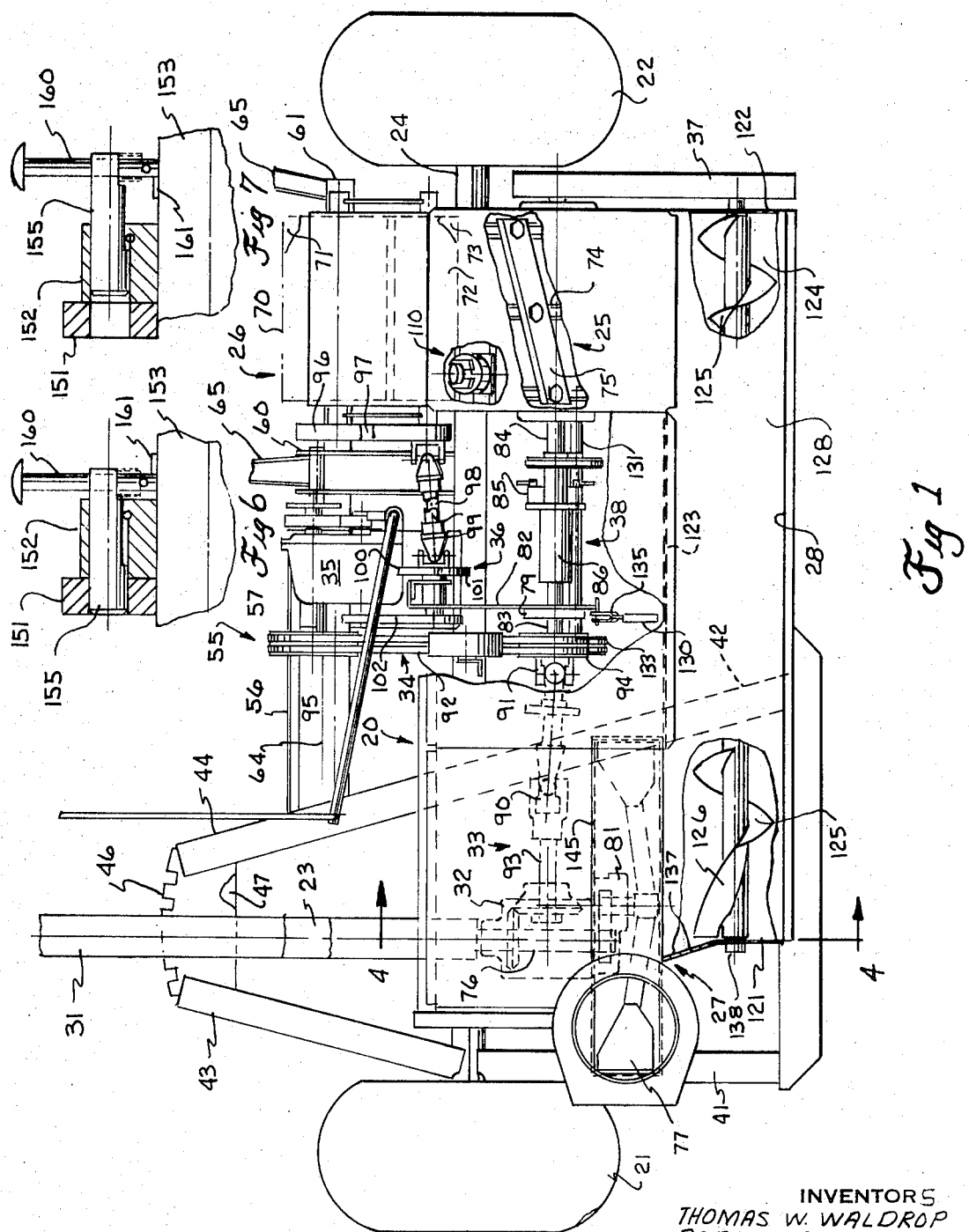

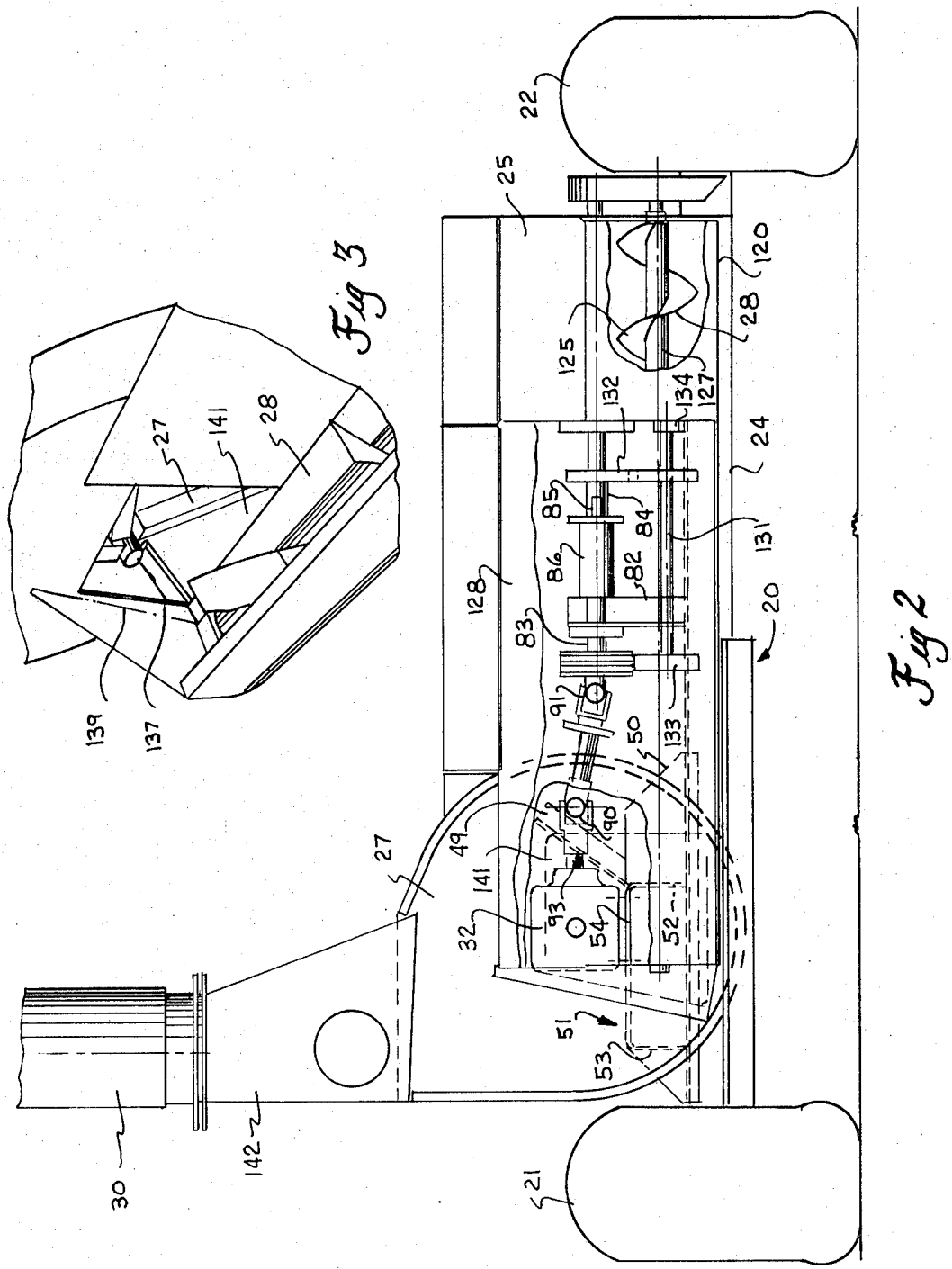

INVENTORS
THOMAS W. WALDROP
ROBERT A. WAGSTAFF
JOSEPH K. WEINLADER
BY George C. Bower
ATTORNEY

FORAGE HARVESTER

BACKGROUND OF THE INVENTION

This invention relates to forage harvesters and is directed to the positioning and mounting of the forage blower and the feeding of silage thereto.

In the past several decades several methods and machines have been developed for the harvesting and storage of crops with a minimum of manual labor. One of these machines is a forage harvester which chops up harvested crops into small, easily handled pieces, generally referred to as silage. The silage is blown into a trailing forage wagon for transport. The silage may be fed directly to livestock or it may be stored in horizontal trench silos or vertical silos for subsequent feeding to troughs or the like by automated conveying means or other types of machinery. Thus livestock may be fed with a minimum of manual labor.

In the forage harvesters it has been the practice to utilize the fan action of the rotating cutting blades of the reel or a blower to the rear of the harvester to discharge and impel the silage up through a transition member and out through a discharge spout into the trailing wagon. This type had the drawback that the discharge spout was offset from the tractor and at an angle to the trailing wagon.

These difficulties and shortcomings are overcome by positioning the forage blower in substantial alignment with the tractor and trailing forage wagon and delivering the silage from the forage harvester by a transverse feed. Prior art forage harvesters of this type have the disadvantage in that the forage blower extends fore-and-aft. This requires a complicated and expensive drive to the forage blower and mounting for the forage blower.

It is therefore the purpose of this invention to provide a less expensive and simplified fan drive and mounting and a more forceful delivery of the silage to the blower.

OBJECTS AND SUMMARY OF THE INVENTION

An object of the invention is to provide an inexpensive drive and mounting of the fan of a forage blower.

Another object of the invention is to provide a delivery of the silage from the transverse auger feed to the forage blower in front of the blades of the fan for adequate impelling of the silage from the fan into the transition member.

In summary the invention comprises the transverse positioning of the forage blower and the mounting of the fan on the main shaft of the gearbox and the feeding of the fan by a longitudinal blade on the end of a transverse feed auger.

These and other objects and advantages of this invention will be apparent from the following description and claims taken in connection with the accompanying drawing which illustrates the various features of this invention.

BRIEF DESCRIPTION OF THE DRAWINGS

FIG. 1 illustrates a top plan view of the forage harvester.

FIG. 2 illustrates a rear view of the forage harvester with portions of the feed mechanism and the blower removed to illustrate the gearbox and drive train.

FIG. 3 is a fragmentary perspective view of the blade on the end of the feed auger and the inlet opening of the forage blower.

FIGS. 6 and 7 are axial views of another embodiment of the disengageable coupling.

INTRODUCTION

Figure 4:
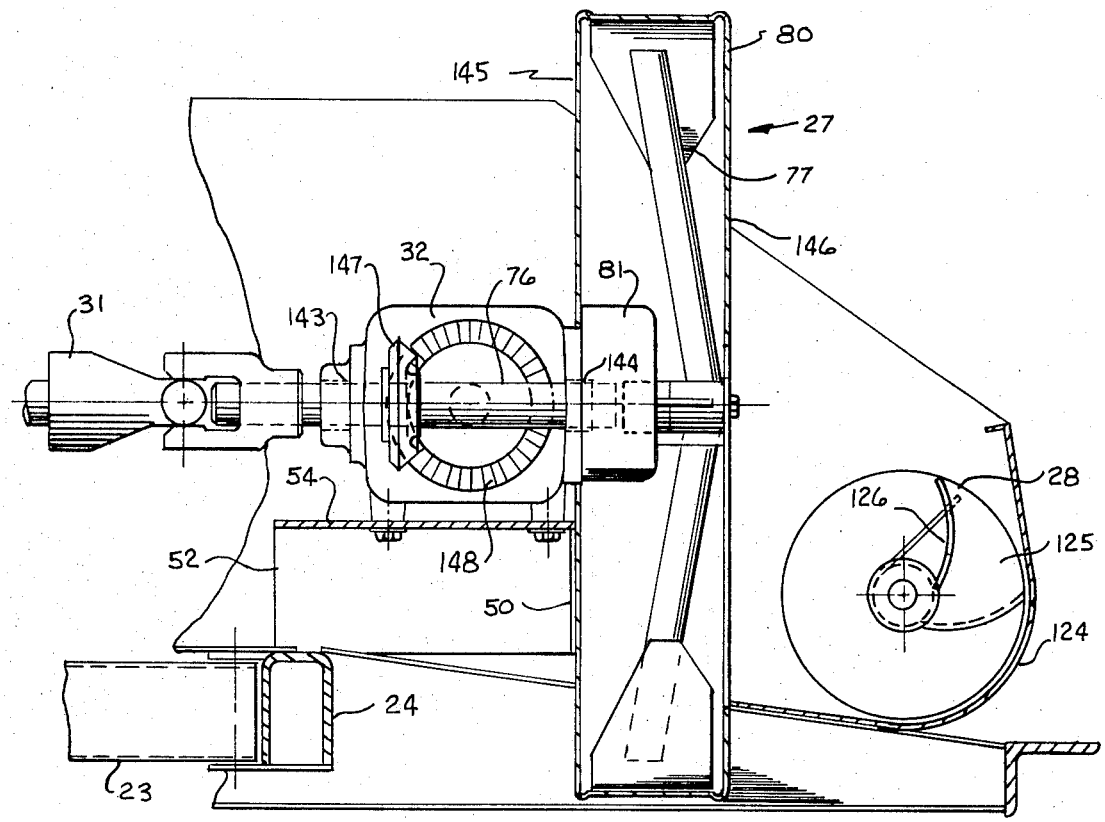
FIG. 4 is a sectional view of the forage blower taken along lines 4—4 of FIG. 1.
Figure 5:
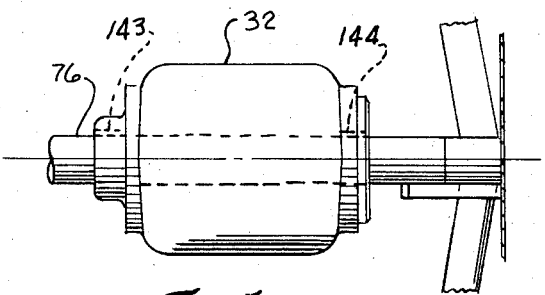
FIG. 5 fragmentarily illustrates the mounting of the fan directly on the main shaft of the gearbox.

The forage harvester has a generally transverse main frame 20 with a main transversely extending square tubular beam. Ground engaging wheels 21,22 rotatably mounted on brackets (not shown) at the respective ends of the beam. The harvester is drawn in direction A by a square tubular hitch 23 pivotally connected to the left end portion of the beam 24. A pickup or row crop attachment (not shown) may be mounted on the right end of the frame for feeding cut crops to the cutterhead 25 through the feed roll mechanism 26. The cutterhead chops the harvested crops into small pieces to form silage. The silage is delivered to the blower 27 by the transverse feed 28 along the rear of the harvester. The blower discharges the silage into a trailing wagon (not shown) through a rearwardly extending spout 30.

Power is delivered to the various operating mechanisms by the main drive shaft 31 extending along and above the hitch from the tractor power take-off (not shown). The main drive shaft 31 is connected to the gearbox 32 mounted on the left end of the forage harvester. The transverse drive train 33 connects the cutterhead 25 to the gearbox. The feed roll mechanism is driven from the drive train through the belt and pulley drive 34, reduction gearbox 35 and drive means 36. The rear transverse feed 28 is driven from the right side of the cutterhead by the chain and sprocket drive 37. The blower is driven directly from the gearbox. A reversing drive 38 adjacent the cutterhead 25 is drivingly connected to the reel 74 on disengagement of the detachable coupling 85 and on actuation of the handle 130 the reel is rotated opposite to the cutting direction for providing new edges on the blades 75 by the sharpener 110.

MAIN FRAME AND HITCH

The main frame comprises in addition to the transverse beam 24 with the ground engaging wheels 21,22, beams 41,42,43 and 44 on the left side. Beams 41,42 extend rearwardly from the transverse beam 24 and are connected at their rear outer ends by the wagon hitch connection 45. The beams 43 and 44 extend forwardly from the transverse beam 24 and at the forward ends are connected by hitch positioning member 46 and the lower strap 47. The beams 42 and 44 are aligned and slanted to the left in the forward direction. The rear beam 41 is perpendicular to the transverse beam 24 and the forward beam 43 is at an angle to the transverse beam 24 so that the beams 43 and 44 converge forwardly. The vertical pivotal connection of the hitch to the transverse beam 24 is substantially midway between the beams 43 and 44 and extends forwardly underneath the hitch position member 46 and above the strap 41 with means at the forward end (not shown) for connection to a tractor.

A horizontally extending, vertically oriented plate 50 is attached to the beams 41 and 42 at the left end and to the rear of the transverse beam 24. The transverse blower 27 is to the rear thereof and connected thereto by welds and a short strut 49 extending upwardly at an angle from the right corner. A pedestal 51 is positioned between the plate 50 and a beam 24 and has downwardly extending flange portions 52 and 53 fastened to the top of the beam 24 and to the side of the plate 50 to position the horizontal support portion 54 higher than the top of the beam 24. The support portion 54 extends rearwardly to the plate 50.

An L-shaped support 55 has a strut 56 and a platform portion 57. The strut extends from the beam 43 toward the right end. The platform portion 57 extends rearwardly from the strut to the beam 24. The platform supports the reduction gearbox 35. Thus the platform is secured to the beams 24 and 43. On the opposite sides of the feed roll mechanism are two arms 60,61 extending upwardly at an angle from the main beam 24. These supports are fixed in position by welding to the beam 24 at one end and provide pivot points for a pickup or row crop attachment at the other end. On the forage harvester below the front of the feed roll mechanism 26 is a rockshaft 64 rotatably mounted in yokes 65 on the side plates of the feed roll mechanism 26 and beam 43. At the feed roll mechanism, the rock shaft has two forwardly extending arms 65 adjacent opposite sides of the feed roll mechanism for supporting and raising and lowering a pickup unit or row crop attachment.

CUTTERHEAD AND FEED ROLLS

The feed roll mechanism 26 is of a conventional design with a set of forward feed rollers 70,71 for feeding harvested crop to a pair of rear feed rollers 72,73 adjacent the shear bar (not shown). The rear feed rollers pass the crop material to the cutting reel 74 over the shear bar for chopping up the cut crop into small sizes by the action between the cutting blades 75 of the reel and the shear bar.

The cutting reel is novel and inventive and is more fully explained in my co-pending application entitled "Forage Harvester Reel" filed on the same day as this application. The cutterhead may have a recutter screen (not shown). The chopped crops are discharged from the rear to the transverse feed 28 for conveyance to the blower 27.

DRIVES

The blower 27 and cutterhead 25 are connected to the tractor power take-off through the gearbox 32 and main drive shaft 31. The gearbox 32 is mounted on the support portion 54 of the U-shaped pedestal 51. The main shaft 76 of the gearbox 32 extends rearwardly fore-and-aft and substantially in the same direction as the drive shaft 31 to support and drive the fan 77. In this embodiment the drives are designed for connection of the main shaft 31 to a tractor power take-off of 1,000 rpm. The gear reduction 81 is connected to the main shaft of the gearbox in the embodiment of FIGS. 1–3. At the lower speed of 540 revolutions per minute the fan 77 of the blower 27 is mounted directly on the main shaft 76 of the gearbox 32, as shown in FIG. 4. The blower casing 80 is mounted on the main frame. The advantages of this design is that the fan is supported by the bearings of the gearbox and separate bearings are not required for supporting the fan 77. This also eliminates the need for an universal joint to accommodate the differences in alignment between the shaft of the gearbox and the shaft of the blower. In the case of the lower speed input of 540 rpm, a gear unit 81 is mounted on the gearbox and the fan is mounted on the shaft of the gear unit to increase the rotational speed to 1,000 rpm.

The drive train 33 connects the gearbox 32 to the cutter reel. The reel shaft 84 is rotated in self-aligning bearings supported at the cutterhead side walls in struts 81 and in a vertical plate 82 mounted on the L-shaped support of the main frame. At the other end short shaft 83 is coupled to the reel shaft 84 by the detachable coupling 85 and resilient coupling 86. The short shaft 83 is mounted in the bearing 79 in a vertical plate 82 mounted on the L-shaped support of the main frame and connected to the gearbox 32 by the universal joints 90 and 91 and the connecting shaft 93. The resilient coupling absorbs the shock or shocks created by the reel in chopping the crop against the shear block. The reel shaft 84 can be decoupled from the short drive shaft 83 so that the reel can be driven in reverse by the reverse drive 38, later described herein. The cutting blades 75 are reground by the sharpener 110 engaging the blades on driving the reel in reverse.

The feed roll mechanism is driven in a conventional manner through the belt and pulley drive 34 which has the pulley 94 mounted on the shaft 83 of the drive means which drives the pulley 95 connected to the reduction gears 35. The chain and sprocket drives 96,97 for the upper and lower feed rolls are driven by the connections 98,99 through the universal joints to the gears 100,101 driven by the chain and sprocket drive 102 connected to the reduction gear 35.

AUGER FEED

The auger feed 28 at the rear of the forage harvester has a bottom casing 120 and end walls 121,122 secured to a transverse wall 123 extending between the cutterhead and the blower. The right end wall 122 is flush with the right side of the cutterhead and feed housing. The bottom and rear curved wall 124 extends past the opening 141 in the side of the blower with the left end wall on the left side of the opening. Within the trough is an auger flight 125 extending the length of the trough to the opening 141 and a blade 126 at the opening. The shaft ends of the auger are rotatably mounted in the end walls and driven by a chain and sprocket drive 37 coupling the reel shaft 84 and the auger shaft 127. The auger flight 125 on the auger shaft 127 extends from the right wall 121 of trough to adjacent to the opening 141. The blade 126 extends longitudinally beyond the flight and has a spiral curved shape for throwing the silage fed by the flight into the blower 27 through the blower opening 141. The trough is closed on top by a transverse extending downwardly pitched cover 128 that is hinged to the upper edge of the rear portion of the trough wall so as to swing rearwardly for access to the trough, auger flight and blade.

The end wall 121 at the blower has an angled wall portion 137 between the auger shaft bearing mounting 138 and the rear side wall 146 of the blower. The wall portion extends the feed conveying chamber of the trough to further overlap with the blower. The inlet opening 141 extends to the edge of the wall portion along the rear side wall 146. The other vertically extending edge 139 converges upwardly towards the blower. The angled wall portion provides a discharge from the trough that is larger and is at an acute angle with the blower to aid in the delivery of the transversely moving silage impelled by the blade 126 forwardly into the blower and the handling by the fan. Thus this space provided by the wall portion increases the smoothness and flow of the silage impelled by the spiral blade 126 into the blower. The wall portion slopes the edge of the opening so that material on the fan and extending through the opening is slid into the casing along the wall portion.

BLOWER AND GEARBOX

The blower 27 extends transversely in the same direction as the beam 24 and is positioned rearwardly thereof with the U-shaped pedestal 51 between the beam and the blower. The front side wall 145 of the blower is secured to the plate 50 and the vertical support 58. The rear side wall 146 of the blower is attached to the rear transverse wall 123 extending to the cutterhead. The gearbox is mounted on the horizontal support portion 54 of the pedestal with the main shaft 76 extending fore-and-aft. The vertical support is secured to the flange 53 and upper U-shaped stamped transverse beam 59. The gearbox is positioned adjacent to the front side wall 145 of the blower and the main shaft 76 extends therein. The gearbox has a casing with bearings 143,144 supporting the shaft 76. The bevel gear 147 on the shaft 76 meshes with the output bevel gear 148 connected to the drive train 33. The fan 77 of the blower is mounted on the end of the main shaft as fragmentarily shown in FIG. 4 when the forage harvester is to be driven by a tractor having a power take-off of 1,000 rpm. When the forage harvester is operated by a 540 rpm power take-off a gear unit 81 is mounted on the end of the main shaft to increase the speed to 1,000 rpm. The fan is mounted on the output shaft of the gear unit 81 and supported by the bearings supporting the output shaft. The gearbox or gearbox and gear unit combination form gear means with the bearings supporting the output shaft also supporting the fan. The fan is rotated in a clockwise direction as shown in FIG. 2 so as to impel the chopped crop material upwardly through the transition member 142 and the adjustable spout 30.

As previously described the advantage of this construction is that the fan 77 utilizes the bearings 143,144 of the gearbox rather than having separate support members and bearings. This greatly reduces the cost of manufacture of the forage harvester.

REVERSE DRIVE

For proper chopping action and to reduce the harvested crops to the desired small size it is essential that the cutting blades be periodically resharpened and rebeveled. The simplest and quickest method is to reverse the rotation of the reel and pass an abrasive stone back and forth across the width of the reel to reform the cutting edges of the reversely rotating blades. The reverse drive 38 comprises a shaft 131, a belt and pulley drive 132 coupling the shaft with the reel shaft and a roller 133. The shaft 131 is mounted in an adjustable bearing 134 at the cutterhead and the movable support means 135. The movable support means is actuated by the handle 136 and moves the roller in and out of engagement with the belt 92 on the pulley 94. Before the roller 133 is moved into engagement the shaft 83 is decoupled from the reel shaft 84 by removing the pins 155 slideably mounted in the block members 152 from the flange 151. In FIG. 1 the pins are held in engaged and disengaged positions by a spring loaded ball detent fitting in grooves in the pins. In FIGS. 6 and 7 another and preferred embodiment of the coupling pins 155 are held in the engaged and disengaged positions by spring loaded bolts 160 pressing against the hub 153 to catch on the stops 161 on the side of the hub 153 for holding the pins in coupled position and on the opposite side of the stops in the decoupled position.

When the coupling is disengaged and the reel 83 is free to rotate in the reverse direction the roller 133 is moved into engagement with the pulley 94 for driving the reel in reverse. The roller 133 is held in engagement by passing the linkage over dead center. Thus by a single decoupling and actuation of a handle the cutting reel is run in reverse directly from the main drive.

SUMMARY OF FEATURES AND ADVANTAGES OF THE INVENTION

It is thus seen from the foregoing description of the invention that the drive to the fan of the forage harvester blower is simply mounted and driven.

The fan is mounted on the main shaft of the gear means through which the forage harvester is driven. This eliminates a separate mounting with bearings for the fan and the coupling between the fan and main gear means shaft. Thus there is a substantial saving in material, manufacturing and replacement costs. This is accomplished without sacrifice in durability and operational performance of the forage blower. The blower casing is advantageously mounted on the frame by fastening the rear side wall of the blower to the rear transverse support plate and the front side wall being secured to the vertical plate 50, vertical support and strut 59 extending upwardly at an angle from the vertical plate 50. Thus the blower casing is securedly mounted on the frame. With the parallel relation of the blower and transverse auger feed the silage is transported to the side of the blower. The blade 126 impels the feed crosswise in front of the fan blades for efficiently carrying of the silage by the fan blades. The angled end wall portion provides an expanded discharge for the flow of silage. Not only is the advantage of a transversely positioned blower obtained but an improved delivery of the silage to the blower is also obtained. Thus an improved transfer of the silage to the blower and a reduction in cost results from the new and inventive design.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and

Having thus described our invention, what we claim is:

1. A forage harvester comprising:
   a supporting frame having ground engaging wheels on opposite ends,
   a hitch portion extending forwardly from said frame adjacent one end thereof,
   a power take-off shaft extending along said hitch portion,
   a gear means mounted on said supporting frame,
   a crop chopper adjacent the other end of said frame for reducing harvested crop to silage,
   a blower with a fan at the one side of said supporting frame and rearward of said hitch portion,
   a feed means extending across said supporting frame from said crop chopper to said blower for delivering silage to said fan for blowing into a trailing forage wagon,
   characterized by
   said blower being transverse to said hitch portion and said power take-off shaft with the axis of rotation of said fan extending fore-and-aft,
   said gear means having an output shaft rotatably supported by said gear means and extending rearwardly,
   said fan mounted on the rearwardly extending free end of said shaft and rotated thereby for discharging silage therefrom.

2. A forage harvester as set forth in claim 1 wherein said blower has a rear inlet opening,
   said feed means has a trough for holding said silage, an auger for moving said silage to said opening and
   a blade to impel silage through said opening into said blower.

3. A forage harvester as set forth in claim 2 wherein the end of said trough at said blower has a wall portion at an acute angle to said blower to form an angled passage from said trough to said inlet opening for passing silage.

4. A forage harvester as set forth in claim 3 wherein said auger has a helical flight extending across said forage harvester and said blade is spiral in shape extending from the end of said helical flight.

5. A forage harvester comprising
   a frame having left and right ends and ground engaging wheels rotatably supporting said frame at said respective ends for movement of said harvester in a fore-and-aft direction and a vertical fore-and-aft extending plate intermediate said ends,
   hitch means and blower mounted at the left end of the frame, said blower having fan with the axis of rotation extending fore-and-aft,
   feed roll mechanism and crop chopper at the right end with the crop chopper immediately to the rear of the feed roll mechanism to receive crops therefrom and having a cutting reel with a shaft rotatably supporting said reel for reducing the crops to silage,
   a cross feed conveyor extending from said crop chopper to said blower for delivery of silage thereto,
   gear means in front of said blower,
   input power shaft connected to said gearbox and extending fore-and-aft along said hitch means,
   said gear means having an output extending toward said right end,
   a short shaft rotatably mounted in said intermediate plate and extending therethrough,
   universal shaft means drivingly connecting said short shaft to said output of said gear means,
   a resilient coupling and detachable coupling connecting said short shaft to said reel shaft to rotate said cutting reel,
   means for driving said feed roll mechanism including a drive connected to said short shaft between said universal shaft means and said resilient coupling and detachable coupling,
   a drive on the right side of said crop chopper drivingly connected to said reel shaft and said cross feed for driving said cross feed and
   said fan drivingly connected to said gear means for discharging silage from said forage harvester received from said cross feed.

6. A forage harvester as set forth in claim 5 wherein said gear means has an output shaft extending rearwardly from said gear means and said fan is mounted on said shaft.

7. A forage harvester as set forth in claim 6 wherein said gear means comprises a gearbox and a gear unit and said output shaft is the output shaft of said gear unit.

8. A forage harvester as set forth in claim 6 wherein said gear means comprises a gearbox and said output shaft is the output shaft of said gearbox.

9. A forage harvester as set forth in claim 1 wherein a reverse drive is engageably and disengageably coupled between said short shaft and said reel shaft to drive said reel in reverse on disengagement of said detachable coupling.

10. A forage harvester as set forth in claim 1 wherein said cross feed conveyor is a trough with an auger rotatably mounted therein and having a spiral shaped axially extending blade at the discharge end for feeding silage to said blower.

11. A forage harvester as set forth in claim 10 wherein said trough has an end wall at said blower with an angled portion extending from said blade to angle the discharge from the end of the cross feed.

* * * * *